(12) United States Patent
Pope et al.

(10) Patent No.: US 11,693,777 B2
(45) Date of Patent: Jul. 4, 2023

(54) NETWORK INTERFACE DEVICE SUPPORTING MULTIPLE INTERFACE INSTANCES TO A COMMON BUS

(71) Applicant: Xilinx, Inc., San Jose, CA (US)

(72) Inventors: Steven L. Pope, Cambridge (GB); Dmitri Kitariev, Newport Beach, CA (US); David J. Riddoch, Huntingdon (GB); Derek Roberts, Cambridge (GB); Neil Turton, Cambridge (GB)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 17/493,694

(22) Filed: Oct. 4, 2021

(65) Prior Publication Data
US 2022/0027273 A1    Jan. 27, 2022

Related U.S. Application Data

(63) Continuation of application No. 16/525,313, filed on Jul. 29, 2019, now Pat. No. 11,138,116.

(51) Int. Cl.
*G06F 12/0831* (2016.01)
*G06F 9/38* (2018.01)
*G06F 12/0888* (2016.01)
*G06F 13/28* (2006.01)

(52) U.S. Cl.
CPC ........ *G06F 12/0835* (2013.01); *G06F 9/3802* (2013.01); *G06F 12/0888* (2013.01); *G06F 13/28* (2013.01)

(58) Field of Classification Search
None
See application file for complete search history.

(56) References Cited

U.S. PATENT DOCUMENTS

| | | | |
|---|---|---|---|
| 9,886,072 B1 | 2/2018 | Venkataraman | |
| 10,298,496 B1 | 5/2019 | Nakibly et al. | |
| 2004/0030840 A1* | 2/2004 | Hesse | G06F 12/121 |
| | | | 711/E12.07 |
| 2006/0195625 A1 | 8/2006 | Hesse | |
| 2009/0304002 A1* | 12/2009 | Yu | H04L 49/30 |
| | | | 370/395.3 |

FOREIGN PATENT DOCUMENTS

| | | |
|---|---|---|
| EP | 2288077 A1 | 2/2011 |
| EP | 2574000 A2 | 3/2013 |
| EP | 3462326 A1 | 4/2019 |

OTHER PUBLICATIONS

U.S. Appl. No. 16/525,313—Office Action Dated Nov. 3, 2020, 10 pages.

(Continued)

*Primary Examiner* — Michael Alsip
(74) *Attorney, Agent, or Firm* — Haynes Beffel & Wolfeld LLP; Andrew L. Dunlap; Paul A. Durdik

(57) ABSTRACT

A network interface device comprises a programmable interface configured to provide a device interface with at least one bus between the network interface device and a host device. The programmable interface is programmable to support a plurality of different types of a device interface.

21 Claims, 10 Drawing Sheets

(56) References Cited

OTHER PUBLICATIONS

Anonymous, "PCie and CCIX Controller IP Through Si Five Program", Nov. 26, 2018 (Nov. 26, 2018), XP055741502, Retrieved from the Internet: URL:https://www.plda.com/blog/category/news/plda-offers-xpressrich-pcie-and-ccix-controller-ip-through-sifive-designshare, 7 pages.
PCT/US2020/044091—International Search Report and Written Opinion dated Nov. 2, 2020, 15 pages.
U.S. Appl. No. 16/525,313—Final Office Action Dated Feb. 16, 2021, 14 pages.
U.S. Appl. No. 16/525,313—Response to Final Office Action dated Feb. 16, 2021 filed Apr. 8, 2021, 18 pages.
U.S. Appl. No. 16/525,313—Response to Office Action dated Nov. 3, 2020, filed Feb. 1, 2021, 18 pages.
U.S. Appl. No. 16/525,313—Notice of Allowance dated May 28, 2021, 7 pages.

\* cited by examiner

Figure 8

*Buffer Table*

| Buffer index | Ownership | Physical start address | Length |
|---|---|---|---|
| 1 | 12 | xA000 | x8FF |
| 2 | 8 | xB000 | xFFF |
| 3 | 7 | xC000 | xC1A |
| 4 | 12 | xD000 | xA10 |
| ... | ... | ... | ... |

Figure 9

S1 – program a programmable interface of a network interface device to provide a device interface with at least one bus between the network interface device and a host device, the programmable interface being programed to support a plurality of different types of a device interface.

NETWORK INTERFACE DEVICE SUPPORTING MULTIPLE INTERFACE INSTANCES TO A COMMON BUS

PRIORITY DATA

This application is a continuation of U.S. patent application Ser. No. 16/525,313, entitled "NETWORK INTERFACE DEVICE SUPPORTING MULTIPLE INTERFACE INSTANCES TO A COMMON BUS", filed on Jul. 29, 2019. The non-provisional application is hereby incorporated by reference for all purposes.

INCORPORATIONS

Materials incorporated by reference in this filing include the following: "Programmable Network Interface Device Comprising a Host Computing Device and a Network Interface Device", PCT Application No: PCT/US2020/044091, filed Jul. 29, 2020.

FIELD

This application relates to a network interface device, systems comprising a host computing device and a network interface device, methods and computer programs.

BACKGROUND

Network interface devices are known and are typically used to provide an interface between a computing device and a network. The network interface device can be configured to process data which is received from the network and/or process data which is to be put on the network.

SUMMARY

According to an aspect, there is provided a network interface device comprising: a programmable interface configured to provide a device interface with at least one bus between the network interface device and a host device, the programmable interface being programmable to support a plurality of different types of a device interface.

The programmable interface may be configured to support at least two instances of device interfaces at the same time.

The programmable interface may comprise a common descriptor cache, said common descriptor cache configured to store respective entries for transactions for the plurality of device interface instances.

An entry in said common descriptor cache may comprise one or more of: pointer information; adapter instance and/or opaque endpoint index; or metadata.

The pointer information may comprise: a pointer; a block of pointers; a linked list of pointers; or a tree.

The metadata may comprise one or more of: an indication if a pointer is a pointer, a pointer to a data location or to a further pointer; a size associated with at least a part of said entry; an indication of an adaptor associated with said entry; an indication of one or more queues; and an indication of a location in one or more queues.

The common descriptor cache may be at least partly partitioned with different partitions being associated with different device interface instances.

The common descriptor cache may be shared between different device interface instances.

The common descriptor cache may provide for each device interface instance a guaranteed cache reservation.

The common descriptor cache may provide for an endpoint instance of a device interface a guaranteed number of descriptors. The endpoint instance may be a queue.

The common descriptor cache may be configured to prefetch one or more descriptors for one or more device interface instances.

The common descriptor cache may be configured to prefetch one or more descriptors for one or more device interfaces in response to one or more of doorbell processing of a doorbell associated with a respective device interface or an arrival of data associated with a respective device interface.

The programmable interface may comprise a scheduler configured to schedule access to said at least bus for the plurality of different device interface instances.

The programmable interface may be configured to provide for each device interface instance, a respective device interface adaptor.

A respective device interface adaptor may comprise a DMA engine.

The programmable interface may be configured to provide a DMA engine which is shared by said at least two device interface instances.

The programmable interface may be configured to provide a doorbell function which is shared by said at least two device interface instances.

The programmable interface may be configured to provide an address translation service which is shared by said at least two device interface instances.

At least two of said plurality of types of device interface may be associated with different queue structure types.

At least two of said plurality of types of device interface may be associated with one or more of different semantics or commands.

The plurality of types of device interface may comprise one or more of RDMA or Virtio or NVMe device interfaces.

The programmable interface may be configured to support one or more different bus protocols of said at least one bus.

The one or more different bus protocols may comprise one or more of: a PCIe bus; an AXI) bus; a CCIX bus; a CAPI bus; or an OPEN CAPI bus The programmable interface may comprise one or more template functions which are programmable to support one or more of said different types of device interface.

While said network interface device is in operation, said programmable interface may be configured to remove at least one device interface instance.

While said network interface device is in operation, said programmable interface may be configured to add at least one device interface instance.

While said network interface device is in operation, said programmable interface may be configured to switch from at least one device interface instance to at least one other device interface instance.

The network interface device may be configured to receive program information configured to control the programming of said network interface device.

The program information may be received from one of said host device or a network.

The program information may comprise one or more of firmware, RTL code, HLS code or instruction sequences.

According to another aspect, a network interface device comprises a programmable interface configured to provide a device interface with at least one bus between the network interface device and a host device, the programmable interface being programmable to support a plurality of different instances of a device interface.

It should be appreciated that any of the features of any other aspect may be used individually or in combination with the network interface device of this aspect.

According to another aspect, there is provided a data processing system comprising a host device and a network interface device, said network interface device comprising: a programmable interface configured to provide a device interface with at least one bus between the network interface device and the host device, the programmable interface being programmable to support a plurality of different types of a device interface.

The programmable interface may be configured to support at least two instances of device interfaces at the same time.

The programmable interface may comprise a common descriptor cache, said common descriptor cache configured to store respective entries for transactions for the plurality device interface instances.

An entry in said common descriptor cache may comprise one or more of: pointer information; adapter instance and/or opaque endpoint index; or metadata.

The pointer information may comprise: a pointer; a block of pointers; a linked list of pointers; or a tree.

The metadata may comprise one or more of: an indication if said pointer is a pointer, a pointer to a data location or to a further pointer; a size associated with at least a part of said entry; an indication of an adaptor associated with said entry; an indication of one or more queues; and a location in one or more queues.

The common descriptor cache may be at least partly partitioned with different partitions being associated with different device interface instances.

The common descriptor cache may be shared between different device interface instances.

The common descriptor cache may provide for each device interface instance a guaranteed cache reservation.

The common descriptor cache may be provided for an endpoint instance of a device interface a guaranteed number of descriptors. The endpoint instance may be a queue.

The common descriptor cache may be configured to prefetch one or more descriptors for one or more device interfaces.

The common descriptor cache may be configured to prefetch one or more descriptors for one or more device interfaces in response to one or more of doorbell processing of a doorbell associated with a respective device interface or an arrival of data associated with a respective device interface.

The programmable interface may comprise a scheduler configured to schedule access to said at least bus for the plurality of different device interface instances.

The programmable interface may be configured to provide for each device interface instance, a respective device interface adaptor.

A respective device interface adaptor may comprise a DMA engine.

The programmable interface may be configured to provide a DMA engine which is shared by said at least two device interface instances.

The programmable interface may be configured to provide a doorbell function which is shared by said at least two device interface instances.

The host device may comprise at least one processor and at least one memory, said memory including computer code for one or more programs.

The at least one memory and the computer code may be configured, with the at least one processor, to cause the host computing device at least to write at least one doorbell to said doorbell function.

The programmable interface may be configured to provide an address translation service which is shared by said at least two device interface instances.

At least two of said plurality of types of device interface may be associated with different queue structure types.

The at least one memory and the computer code may be configured, with the at least one processor, to cause the host computing device to provide one or more queues for one or more device interface instances.

At least two of said plurality of types of device interface may be associated with one or more of different semantics or commands.

The plurality of types of device interface may comprise one or more of RDMA or Virtio or NVMe device interfaces.

The programmable interface may be configured to support one or more different bus protocols of said at least one bus.

The one or more different bus protocols may comprise one or more of: a PCIe bus; an AXI) bus; a CCIX bus; a CAPI bus; or an OPEN CAPI bus The programmable interface may comprise one or more template functions which are programmable to support one or more of said different types of device interface.

While said network interface device is in operation, said programmable interface may be configured to remove at least one device interface instance.

While said network interface device is in operation, said programmable interface may be configured to add at least one device interface instance.

While said network interface device is in operation, said programmable interface may be configured to switch from at least one device interface instance to at least one other device interface instance.

The network interface device may be configured to receive program information configured to control the programming of said network interface device.

The program information may be received from one of said host device or a network.

The program information may comprise one or more of firmware, RTL code, HLS code or instruction sequences.

According to another aspect, there is provided a data processing system comprising a host device and a network interface device, said network interface device comprising: a programmable interface configured to provide a device interface with at least one bus between the network interface device and the host device, the programmable interface being programmable to support a plurality of different instances of a device interface.

It should be appreciated that any of the features of any other aspect may be used individually or in combination with the data processing system of this aspect.

According to an aspect, there is provided a method comprising: programming a programmable interface of a network interface device to provide a device interface with at least one bus between the network interface device and a host device, the programmable interface being programmable to support a plurality of different types of a device interface.

The method may comprise programming said programmable interface to support at least two instances of device interfaces at the same time.

The programmable interface may comprise a common descriptor cache, said common descriptor cache configured to store respective entries for transactions for the plurality of device interface instances.

An entry in said common descriptor cache may comprises one or more of: pointer information; adapter instance and/or opaque endpoint index; or metadata.

The pointer information may comprise: a pointer; a block of pointers; a linked list of pointers; or a tree.

The metadata may comprise one or more of: an indication if said pointer is a pointer, is a pointer to a data location or to a further pointer; a size associated with at least a part of said entry; an indication of an adaptor associated with said entry; an indication of one or more queues; and a location in one or more queues.

The method may comprise causing said common descriptor cache to be at least partly partitioned with different partitions being associated with different device interface instances.

The method may comprise causing said common descriptor cache to be shared between different device interface instances.

The method may comprise causing said common descriptor cache to provide for each device interface instance a guaranteed cache reservation.

The method may comprise causing said common descriptor cache to provide for an endpoint instance of a device interface a guaranteed number of descriptors. The endpoint instance may be a queue.

The method may comprise causing said common descriptor cache to prefetch one or more descriptors for one or more device interfaces.

The method may comprise causing said common descriptor cache to prefetch one or more descriptors for one or more device interfaces in response to one or more of doorbell processing of a doorbell associated with a respective device interface or an arrival of data associated with a respective device interface.

The programmable interface may comprise a scheduler configured to schedule access to said at least bus for the plurality of different device interface instances.

The method may comprise causing the programmable interface to provide for each device interface instance, a respective device interface adaptor.

A respective device interface adaptor may comprise a DMA engine.

The programmable interface may comprise a DMA engine which is shared by said at least two device interface instances.

The programmable interface may comprise a doorbell function which is shared by said at least two device interface instances.

The programmable interface may be configured to provide an address translation service which is shared by said at least two device interface instances.

The method may comprise causing the programmable interface to support a plurality of different queue structure types associated with respective different device interfaces.

The method may comprise causing the programmable interface to support a plurality of different semantics or commands associated with respective different device interfaces.

The plurality of types of device interface may comprise one or more of RDMA or Virtio or NVMe device interfaces.

The method may comprise causing the programmable interface to support a plurality of different bus protocols of said at least one bus.

The one or more different bus protocols may comprise one or more of: a PCIe bus; an AXI) bus; a CCIX bus; a CAPI bus; or an OPEN CAPI bus The method may comprise causing one or more template functions of the programmable interface to be programmed to support one or more of said different types of device interface.

The method may comprise causing, while said network interface device is in operation, at least one device interface instance to be removed.

The method may comprise causing, while said network interface device is in operation, at least one device interface instance to be added.

The method may comprise causing, while said network interface device is in operation, at least one device interface instance to be switched to at least one other device interface instance.

The method may comprise receiving program information configured to control the programming of said network interface device.

The method may comprise receiving the program information from one of said host device or a network.

The program information may comprise one or more of firmware, RTL code, HLS code or instruction sequences.

According to another aspect, there is provided a data processing system comprising: a network interface device; and a host computing device comprising at least one processor and at least one memory, said memory including computer code for one or more programs, the at least one memory and the computer code configured, with the at least one processor, to cause the host computing device at least to compile a program defining a device interface with respect to said network interface device, said compiled program being installed in said host computing device to define a host interface for said device interface and in said network interface device to define a corresponding device interface.

The program may comprise a high-level program.

The compiled program may provide firmware, HLS code or RTL code to define said corresponding device interface.

The compiled program may provide an intermediate level program defining at least a part of said device driver and said host computing device is configured to determine that at least a part of said intermediate level program can be inserted into a kernel of the host computing device.

The host interface may comprise a device driver.

The host interface may comprise a dynamically loaded program.

The host interface may be at least one of verified for execution, provided as sandbox code or provided as bytecode.

The network interface device may be as previously mentioned.

The network interface device may comprise: a programmable interface configured to provide a device interface with at least one bus between the network interface device and the host device, the programmable interface being programmable to support a plurality of different types of a device interface. The compiled program may be installed in the programmable interface.

The programmable interface may be configured to support at least two device interface instances at the same time.

The programmable interface may comprise a common descriptor cache, said common descriptor cache configured to store respective entries for transactions for the plurality of device interface instances.

An entry in said common descriptor cache may comprises one or more of: pointer information; adapter instance and/or opaque endpoint index; or metadata.

The pointer information may comprise: a pointer; a block of pointers; a linked list of pointers; or a tree.

The metadata may comprise one or more of: an indication if said pointer is a pointer, is a pointer to a data location or to a further pointer; a size associated with at least a part of said entry; an indication of an adaptor associated with said entry; an indication of one or more queues; and a location in one or more queues.

The common descriptor cache may be at least partly partitioned with different partitions being associated with different device interface instances.

The common descriptor cache may be shared between different device interface instances.

The common descriptor cache may provide for each device interface instance a guaranteed cache reservation.

The common descriptor cache may provide for an endpoint instance of a device interface a guaranteed number of descriptors. The endpoint instance may be a queue.

The common descriptor cache may be configured to prefetch one or more descriptors for one or more device interfaces.

The common descriptor cache may be configured to prefetch one or more descriptors for one or more device interfaces in response to one or more of doorbell processing of a doorbell associated with a respective device interface or an arrival of data associated with a respective device interface.

The programmable interface may comprise a scheduler configured to schedule access to said at least bus for the plurality of different device interface instances.

The programmable interface may be configured to provide for each device interface instance, a respective device interface adaptor.

A respective device interface adaptor may comprise a DMA engine.

The programmable interface may be configured to provide a DMA engine which is shared by said at least two device interface instances.

The programmable interface may be configured to provide a doorbell function which is shared by said at least two device interface instances.

The host device may comprise at least one processor and at least one memory, said memory including computer code for one or more programs.

The at least one memory and the computer code may be configured, with the at least one processor, to cause the host computing device at least to write at least one doorbell to said doorbell function.

The programmable interface may be configured to provide an address translation service which is shared by said at least two device interface instances.

At least two of said plurality of types of device interface may be associated with different queue structure types.

The at least one memory and the computer code may be configured, with the at least one processor, to cause the host computing device to provide one or more queues for one or more device interface instances.

At least two of said plurality of types of device interface may be associated with one or more of different semantics or commands.

The plurality of types of device interface may comprise one or more of RDMA or Virtio or NVMe device interfaces.

The programmable interface may be configured to support one or more different bus protocols of said at least one bus.

The one or more different bus protocols may comprise one or more of: a PCIe bus; an AXI) bus; a CCIX bus; a CAPI bus; or an OPEN CAPI bus The programmable interface may comprise one or more template functions which are programmable to support one or more of said different types of device interface.

While said network interface device is in operation, said programmable interface may configured to remove at least one device interface instance.

While said network interface device is in operation, said programmable interface may be configured to add at least one device interface instance.

While said network interface device is in operation, said programmable interface may be configured to switch from at least one device interface instance to at least one other device interface instance.

According to another aspect, there is provided a method comprising: causing a host computing device to compile a program defining a device interface with respect to a network interface device, said compiled program being installed in said host computing device to define a host interface for said device interface and in said network interface device to define a corresponding device interface.

The program may comprise a high-level program.

The compiled program may provide firmware, HLS code or RTL code to define said corresponding device interface.

The compiled program may provide an intermediate level program defining at least a part of said device driver and the method comprises determining that at least a part of said intermediate level program can be inserted into a kernel of the host computing device.

The host interface may comprise a device driver.

The host interface may comprise a dynamically loaded program.

The host interface may be at least one of verified for execution, provided as sandbox code or provided as bytecode.

The network interface device may be as previously mentioned.

The method may comprise installing said compiled program in a programmable interface of said network interface device, said programmable interface being programmable to support a plurality of different types of a device interface.

The method may comprise programming said programmable interface to support at least two instances of device interfaces at the same time.

The programmable interface may comprise a common descriptor cache, said common descriptor cache configured to store respective entries for transactions for the plurality device interface instances.

An entry in said common descriptor cache may comprises one or more of: pointer information; adapter instance and/or opaque endpoint index; or metadata.

The pointer information may comprise: a pointer; a block of pointers; a linked list of pointers; or a tree.

The metadata may comprise one or more of: an indication if said pointer is a pointer, is a pointer to a data location or to a further pointer; a size associated with at least a part of said entry; an indication of an adaptor associated with said entry; an indication of one or more queues; and a location in one or more queues.

The method may comprise causing said common descriptor cache to be at least partly partitioned with different partitions being associated with different instances of device interfaces.

The method may comprise causing said common descriptor cache to be shared between different device interface instances.

The method may comprise causing said common descriptor cache to provide for each device interface instance a guaranteed cache reservation.

The method may comprise causing said common descriptor cache to provide for an endpoint instance of a device interface a guaranteed number of descriptors. The endpoint instance may be a queue.

The method may comprise causing said common descriptor cache to prefetch one or more descriptors for one or more device interfaces.

The method may comprise causing said common descriptor cache to prefetch one or more descriptors for one or more device interfaces in response to one or more of doorbell processing of a doorbell associated with a respective device interface or an arrival of data associated with a respective device interface.

The programmable interface may comprise a scheduler configured to schedule access to said at least bus for the plurality of different device interface instances.

The method may comprise causing the programmable interface to provide for each instance of a device interface, a respective device interface adaptor.

A respective device interface adaptor may comprise a DMA engine.

The programmable interface may be configured to provide a DMA engine which is shared by said at least two instances of device interfaces.

The programmable interface may be configured to provide a doorbell function which is shared by said at least two device interface instances.

The host device may comprise at least one processor and at least one memory, said memory including computer code for one or more programs.

The at least one memory and the computer code may be configured, with the at least one processor, to cause the host computing device at least to write at least one doorbell to said doorbell function.

The programmable interface may be configured to provide an address translation service which is shared by said at least two device interface instances.

The method may comprise causing the programmable interface to support a plurality of different queue structure types associated with respective different device interfaces.

The method may comprise causing the host interface to provide one or more queues for one or more device interface instances.

The method may comprise causing the programmable interface to support a plurality of different semantics or commands associated with respective different device interfaces.

The plurality of types of device interface may comprise one or more of RDMA or Virtio or NVMe device interfaces.

The method may comprise causing the programmable interface to support a plurality of different bus protocols of said at least one bus.

The one or more different bus protocols may comprise one or more of: a PCIe bus; an AXI bus; a CCIX bus; a CAPI bus; or an OPEN CAPI bus The method may comprise using the compiled program to program one or more template functions of the programmable interface to support a respective device interface.

The method may comprise causing, while said network interface device is in operation, at least one device interface instance to be removed.

The method may comprise causing, while said network interface device is in operation, at least one device interface instance to be added.

The method may comprise causing, while said network interface device is in operation, at least one device interface instance to be switched to at least one other device interface instance.

According to another aspect, there is provided a non-transitory computer readable medium encoded with instructions, in which the instructions when executed on at least one processor enable the at least one processor to execute the steps of any of the previous methods.

In another aspect a computer program product comprises computer executable code which when run is configured to provide any of the above methods.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

BRIEF DESCRIPTION OF FIGURES

Some embodiments will now be described by way of example only with reference to the accompanying Figures in which:

FIG. 8 shows a buffer table used to determine a location of a buffer;

FIG. 9 shows a method of one embodiment; and

DETAILED DESCRIPTION

The following description is presented to enable any person skilled in the art to make and use the invention and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown but is to be accorded the widest scope consistent with the principles and features disclosed herein.

When data is to be transferred between two data processing systems over a data channel, such as a network, each of the data processing systems has a suitable network interface to allow it to communicate across the channel. Often the network is based on Ethernet technology. Other embodiments may be based on other technologies.

Data processing systems that are to communicate over a network are equipped with network interfaces that are capable of supporting the physical and logical requirements of the network protocol. The physical hardware component of network interfaces are referred to as network interface devices or network interface cards (NICs).

Figure 1:
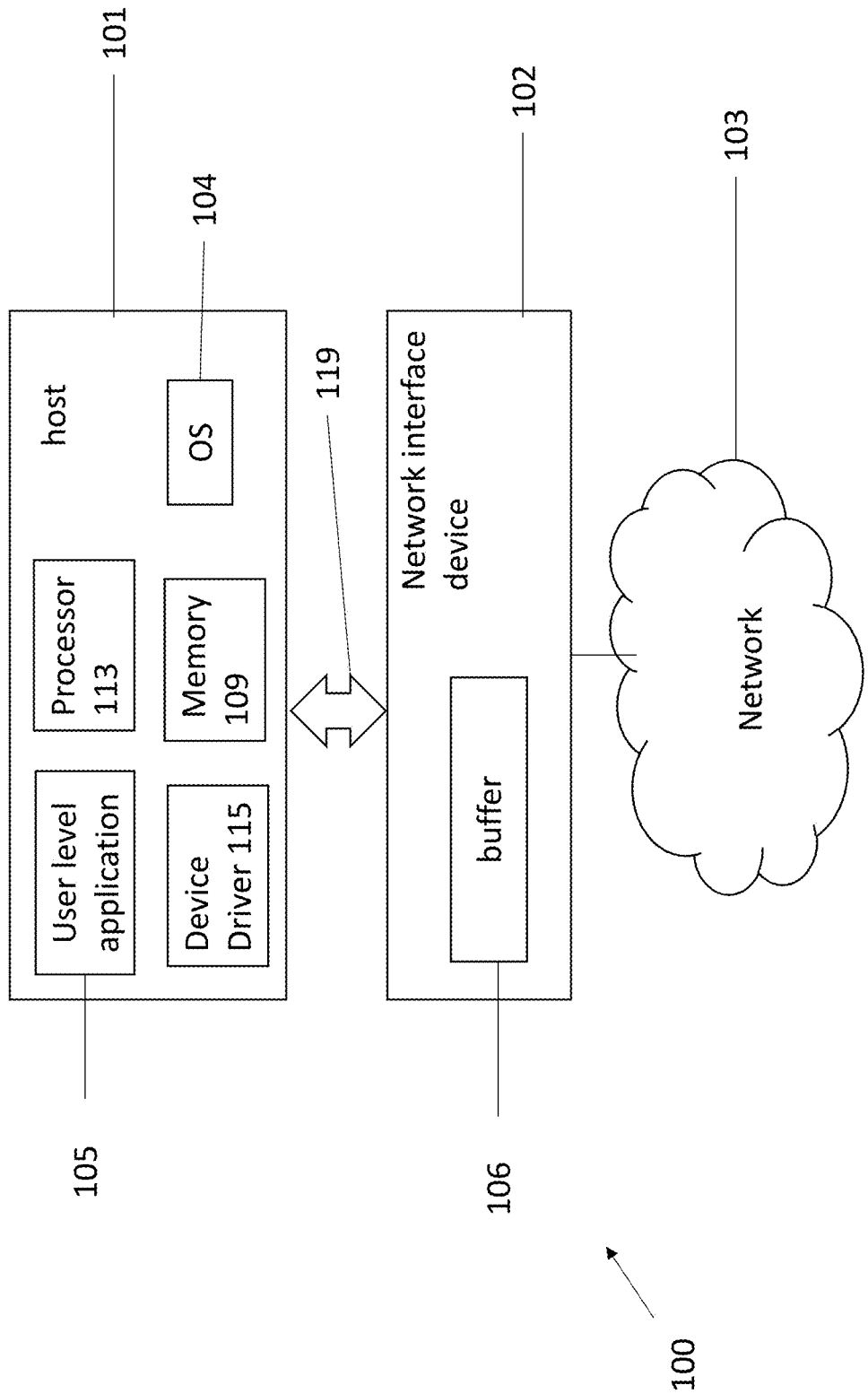
FIG. 1 shows a schematic view of a data processing system coupled to a network.

A typical data processing system 100 for transmitting and/or receiving across a network is shown in FIG. 1. The data processing system 100 comprises a host computing device 101 coupled to a network interface device 102 that is arranged to interface the host computing device to the network 103. The host computing device 101 is provided with a device driver 115 for the network interface device 102. The host computing device 101 includes an operating system 104 supporting one or more user level applications 105. The host computing device 101 may also include a network protocol stack (not shown). For example, the protocol stack may be a component of the application, a library with which the application is linked, and/or or be provided by the operating system. In some embodiments, more than one protocol stack may be provided.

The network protocol stack may be a Transmission Control Protocol (TCP) stack. The application 105 can send and receive TCP/IP messages by opening a socket and reading and writing data to and from the socket. The operating system 104 may cause the messages to be transported across the network. For example, the application can invoke a system call (syscall) for transmission of data through the socket and then via the operating system 104 to the network 103.

Instead of implementing the stack in the host computing device 101, some systems may offload at least a part of the protocol processing to the network interface device 102. For example, the network interface device 102 may comprise a TCP Offload Engine (TOE) for performing the TCP protocol processing. Data to be transmitted over the network, may be sent by an application 105 via a TOE-enabled virtual interface driver, by-passing the TCP/IP stack in the host computing device partially or entirely. Data sent along this fast path therefore need only be formatted to meet the requirements of the TOE driver.

It should be appreciated that a TOE function is one example of a function which may be offloaded to the network interface device. Alternatively, or additionally, one or more other functions may be offloaded to the network interface device. By way of example, part of the protocol processing may be offloaded to the network interface device, an application may be at least partially provided on the network interface device and/or the like.

The network interface device may comprise one or more buffers 106. The buffers 106 may be any suitable memory, a FIFO, or set of registers. The buffer may be such that any operations which require modifications to the frame (for example checksum insertion into headers) are completed before that portion of the frame is transferred to the MAC (media access control).

The host computing device 101 may comprise one or more processors 113 and one or more memories 109. (The one or more processors may in practice provide at least a part of the operating system and the user level application in conjunction with the one or more memories).

It should be appreciated that the memory space of the system may be provided by one or more of: one or more memories on the host computing device, one or more memories on the network interface device, and one or more memories external to the host computing device and the network interface device.

In some embodiments, the host computing device 101 and the network interface device 102 may communicate via one or more buses 119. By way of example only, the bus may be a PCIe (peripheral component interconnect express) bus, an AXI (advanced eXtensible interface) bus, a CCIX (Cache Coherent Interconnect for Accelerators) bus, a CAPI (Coherent Accelerator Processor Interface) bus, an OPEN CAPI bus or any other suitable bus. Where two or more busses are provided, at least one bus may use a different bus protocol to at least one other bus or all the busses may use the same bus protocol.

During operation of the data processing system, data to be transmitted onto the network may be transferred from the host computing device 101 to the network interface device 102 for transmission. Data received from the data network may be passed to the host device via the network interface device.

In some embodiments, the data transfers are managed using device queue techniques. The device queue techniques may support DMA (direct memory access). With DMA, the network interface device is able to send data to or receive data from the memory, bypassing the CPU of the host device. Data which is received from the network is written directly to host memory at a location indicated by one or more descriptors (for example in a receive queue). With data which is to be transmitted onto the network, the network interface transmits the data in a memory location indicated by one or more descriptors (for example in a transmit queue).

The host device and the network interface device communicate via a device interface. There are various different ways in which the interface between the host device and the network interface device may be implemented. The interface between the host device and the network interface device will be referred to as a device interface in the following.

The device interface may be specified such as in industry specifications and/or in proprietary specifications. Such specifications may define how the host computing device and/or the network interface device are to be configured in order to allow the host and device to operate together.

One aspect of a device interface is how the queues (sometimes referred to as rings) are defined and managed. Some device interfaces may not require queue type structures.

Figure 2:
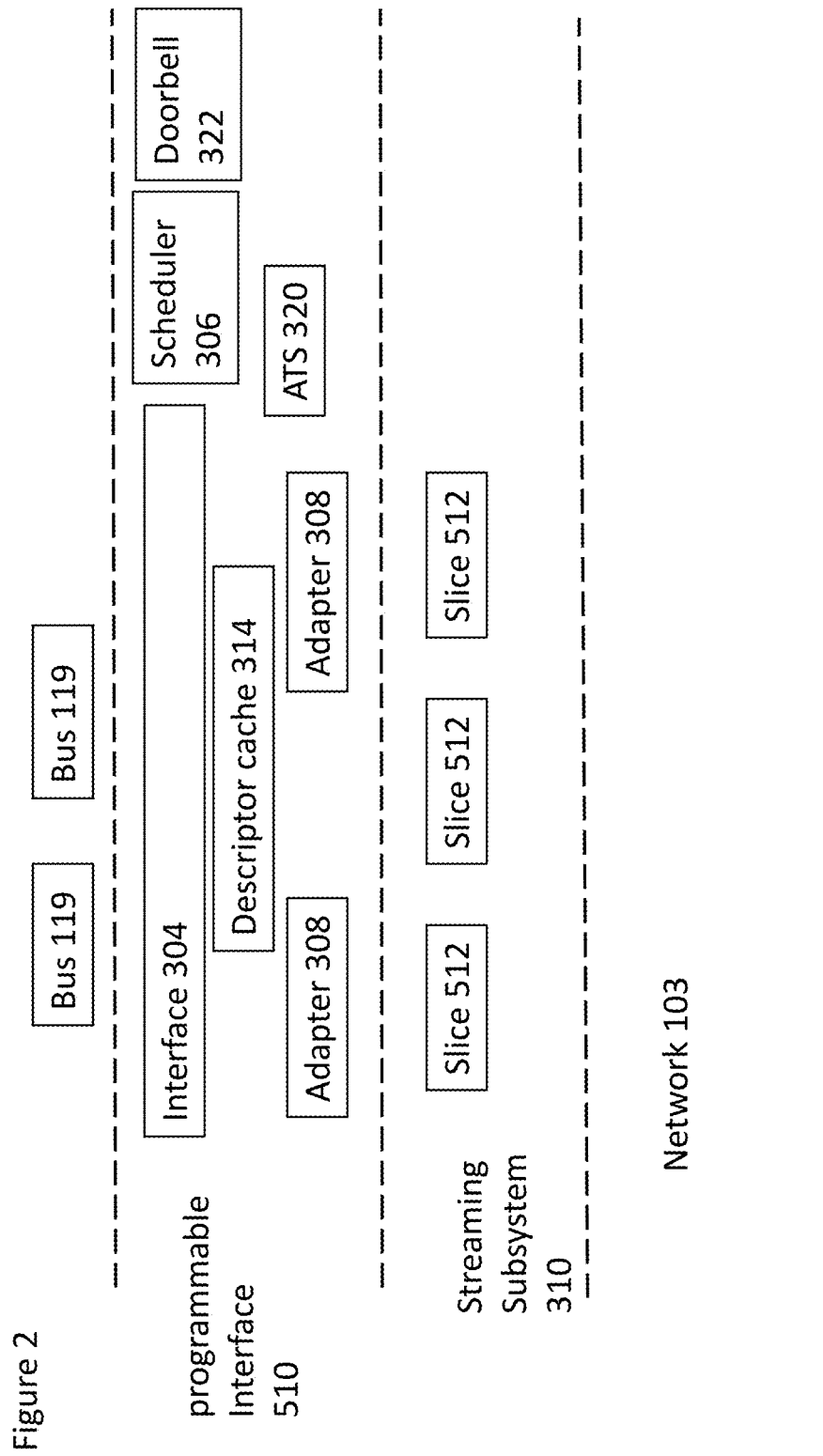
FIG. 2 shows a schematic view of a first network interface device.

Reference is made to FIG. 2 which shows in more detail a programmable interface 510 of the network interface device. The programmable interface may be configured to support a plurality of different device interfaces and/or a plurality of different bus protocols. The programmable interface may support one or more instances of a device interface at the same time and/or one or more buses at the same time.

Where two or more instances of a device interface are supported, they may be supporting the same or different device interface specifications. The number of instances of the device interface may change during operation of the network interface device. The type(s) of device interface supported may change during operation of the network interface device.

Where two or more buses are supported, they may be supporting the same or different bus protocols. The number of buses may change during operation of the network interface device. The bus protocol of one or more buses may change during operation of the network interface device.

The programmable interface may support different device interfaces depending on the device interface requirements. For example, a device interface may use a queue or ring pair structure: TX/RX and optionally an event notification channel (or completion queue) or the device interface may use a relatively large memory window. In this latter example, frames of data are managed by writes in an incrementing manner and a queue type structure is not required.

Different device interfaces may implement the interaction between the host computing device and the network interface device in different ways.

Different device interfaces may be associated with different semantics.

In some device interface specifications, the commands used to control processes may referred to descriptors. A descriptor may identify a starting address and is sometimes referred to as a pointer.

Depending on the device interface, the host computing device may create a work queue or a descriptor ring in a memory. This work queue may have one or more commands. The host may transfer one or more commands, across the communication channel, from the queue to a local memory on the network interface device. These commands may be stored in a descriptor cache (which will be described in more detail later in the programmable interface).

The network interface device may both transmit and receive data from a network. In an example device interface specification, two work queues may be set up in the memory, a transmit (TX) work queue identifying data buffers in memory ready for transmitting onto the network, and a receive (Rx) work queue identifying data buffers in memory that are available to receive data incoming from the network.

As mentioned previously, there may be different ways of managing descriptors depending on the device interface. In some embodiments, the programmable interface of the network interface device is configured such that the same network interface device can support any one or more of a plurality of different device interface specifications. For example, a plurality of different ways of implementing descriptors may be supported by the programmable interface.

The semantics of the different device interface specifications and/or the queue management and/or queue structure may be different. For example, different specifications may have different commands and/or different semantics for a particular command and/or different actions for different commands. In some specifications, a separate completion queue may be provided whilst in other specifications, no completion queue is provided. Different device interfaces may require different metadata. Different device interfaces may use different checksum mechanisms (for example using a different calculation technique and/or calculating over a different set of data). Different device interface may have different ways of providing validated checksum information. By way of example only, the information may be provided as a prefix to packet data or as part of a completion.

The specifications may differ in how frames of data are dealt with respect to a buffer. For example, a buffer may receive one and only one frame of data, a buffer may receive a plurality of frames of data or a single frame may span two or more buffers. This may be defined by the device interface specification or a particular implementation of the host specification.

A device interface may support indirect descriptors where one descriptor in a ring points at a table of more descriptors, rather than a data buffer. This may be used for example to "extend" a ring. This type of arrangement may be supported by for example Virtio which is discussed more later.

One or more of the device interface specifications may define how and/or when the transactions are put on to the bus. These may be DMA related transactions for example.

For example, some specifications may aggregate transactions in some or all circumstances. Some specifications may specify that single transactions are separately put onto the bus. Some specifications may define the attributes of the transactions put onto the bus such as alignment and/or padding.

The device interface may be a "standardized" interface or a proprietary interface or even an implementation specific interface. By way of example only, some approaches to implementing a device interface are provided by RDMA (remote direct memory access), Virtio, and NVMe (Non-Volatile Memory Host Controller Interface Express). NVMe is an open logical device interface specification for accessing non-volatile storage media attached via a PCI Express (PCIe) bus.

Virtio devices are found in virtual environments. By design they look like physical devices to the guest within the virtual machine. The Virtio specification treats them as such. This similarity allows the guest to use standard drivers and discovery mechanisms. The purpose of the Virtio specification is that virtual environments and guests should have a standard and extensible mechanism for virtual devices. A Virtio device may be implemented in hardware as a physical interface. This allows a guest operating system image to execute in an environment without a hypervisor.

EF100 provided by the present applicant is an example of a so-called proprietary specification.

It should be appreciated that these examples of different device interfaces are by way of example only and other embodiments may alternatively or additionally be used with any suitable device interface.

The specifications may define a virtualized behavior and/or a hardware behavior and/or a software behavior and/or a firmware behavior.

The programmable interface is configured such that requirements of at least two different device interfaces can be supported by the same programmable interface.

As mentioned, the different device interfaces may have different requirements, for example for implementing queue type structures. For example, the layout and function of at least some of the queues may be broadly similar but nevertheless have some differences. For example, one or more of the format and layout of descriptors, the indexes of pointers, the commands and notification completions may differ.

For example, EF100 has receive queues, transmit queues and event queues.

Some device interface specifications may have a set of network interface device to host, host to network device and completion rings. By way of example, a transaction queue may be comprised of the following elements: descriptor ring, completion ring, data buffers, doorbells and interrupt target.

One example of a device interface specifications may define a number of user configurable host profiles, where each profile specifies which one of two memory regions holds a particular queue element. In some embodiments, the number of user configurable host profiles is 16. It should be appreciated that this is by way of example only and other implementations may have a different number of user configurable host profiles.

For example, a PCI physical function or a virtual function may be designated to support a number of Virtio queues (VRINGs) and have a Virtio-net personality. Another function may support NVMe queue pairs and have a NVME personality.

Every queue may be assigned one of the preconfigured host profiles.

A profile can specify that queue data, rings, and interrupts are in the first host memory space. Likewise, the queue can be housed in the second host memory space. The queue can have its elements in different spaces. For example, the data may come from the first host memory but the descriptors, completions and interrupts belong to the second host memory or vice versa.

A device interface adaptor 308 (which will be described in more detail later) may allow host to network interface queue descriptors to choose the data location that overrides the data location specified in the queue's host profile.

The device interface adapter may support a DMA host profile feature, by storing the queue's assigned profile ID in local queue state tables and supplying the ID as necessary as a part of the adapter DMA transaction.

RDMA has a set of queue pairs. The set may comprise 32 k-128 k queue pairs in some embodiments. Each queue pair may support an SQ (send queue), an RQ (receive queue) and a CQ (complete queue).

Virtio may have one or more pairs of VIRT queues and optionally a control VIRT queue. In some embodiments, a Virtio block device provides a block storage interface via a single VIRT queue. The driver submits read requests, which transfer blocks of data from the storage to the driver, and write requests, which transfer blocks of data from the driver to the device. A Virtio device may require a descriptor table, available ring and used ring.

An instance of the device interface provides a communication channel between a host software entity and the hardware data-path.

The programmable interface 510 may be at least partially provided by configurable hardware. The configurable hardware may be any suitable configurable hardware. By way of example only, the programmable interface 510 may be provided by one or more of an FPGA and ASIC micro engines. Operations which are to be performed by the programmable interface may be specified in a high-level language. This may then be compiled to a gate level or RTL (register transfer language). Alternatively, the operations may be provided as firmware programmed into a microprocessor of an ASIC or the like. A program such as HLS (high level synthesis) may be used.

The same programmable interface 510 may in some embodiments be programmed to support any one or more suitable bus protocols and/or any one or more suitable device interface specifications. This may be when the network interface device is first used and/or may be whilst the device is being used.

The programmable interface 510 has an interface 304 with one or more shared buses 119. (By way of example only, FIG. 2 shows two buses) The bus 119 are provided between the host device and the network interface device. Depending on how the network interface device is deployed, the interface 304 may be configured to interface with one or more buses 119. Where there is more than one bus, the buses may operate in accordance with the same or different protocols, such as previously described. In some embodiments, the interface may alternatively be configured to support one or more buses which can be split into smaller units (e.g. bi-furcation or quad-furcation).

FIG. 2 also shows a streaming subsystem 310 which has one or more data slices 512. A slice may perform for example data processing on data before it is transmitted or after it has been received.

The programmable interface 510 is configured to implement one or more adaptors 308. An adaptor may support an instance of a device interface. In some embodiments an adaptor may support more than one instance of a device interface. Where there are more than one adaptors implemented, the different adaptors may be configured to support different device interfaces. In some embodiments, more than one adaptor may use the same device interface specification.

An adaptor may be configured to run and control the respective operations to and/or from the host compute device. This may be after hardware virtualization.

An adaptor may be for one or more of communication to and communication from the host device. The adaptors may support one or more of DMA transactions to and from the host (for example for data received from the network, data to be transmitted onto the network and/or information transferred via DMA as part of the virtual device interface such as descriptor fetch and/or the like).

The one or more adaptors may receive an input from and/or provide an output to one or more slices 512. The slices may be part of a streaming subsystem 310. In some embodiments, a given slice may communicate with a single adaptor or more than one adaptor.

The programmable interface 510 has a common scheduler function 306 which controls access to the one or more buses. The scheduler function may for example control access to the shared bus between the network interface device and the host. The bus has a finite bandwidth which needs to be shared between for example different instances of device interfaces. For example, the scheduler is configured to ensure that each transaction of the different instances of the device interfaces is supported. The scheduler needs to schedule the bus resources (e.g. DMA bandwidth) amongst all the transactions. As well as the device interface instances, the programmable interface may support other DMA clients (such as user-defined external kernels). The scheduler may be configured to also schedule these functions.

In some embodiments, a single scheduler function is configured to manage the scheduling.

The scheduler may also schedule device resources such as buffers in a data path slice. The scheduler may be used to enforce quality of service policy between virtual device interfaces. The quality of service policy may relate to one or more of priority or bandwidth, for example per queue. The scheduler may manage fairness between different subsystems of the network interface device.

The transactions of the adaptors are scheduled by the scheduler 306. The scheduler may, in some embodiments, also manage any other required accesses.

The programmable interface comprises a doorbell function 322. All doorbells associated with the different instances of the device interfaces from the host to the network interface device are written to this common doorbell function. The use of doorbells and/or how they are implemented and/or how they are used may be dependent on a respective device interface. For example, the host may provide a door bell when the host has data to be written. The host may provide a doorbell to indicate a receive queue. More generally, the host may provide a doorbell to the doorbell function when it wants something to be done by the programmable interface 510.

The doorbell function may be configured to determine the adaptor for which a doorbell is intended by the base address of the doorbell write.

The doorbell itself may be a relatively large frame of data or can be relatively short, for example indicating a particular queue or an index in a queue and/or the like. For example, a relatively large doorbell may comprise data to be transmitted, either the first part of a frame or an entire frame. When a doorbell is written to the doorbell function, this will cause an adaptor 308 supporting an instance of the device interface for which the doorbell is intended to respond appropriately to that doorbell.

A doorbell may typically be generated by a host CPU executing load/store like instructions to a destination address which is mapped to cause target bus writes to be issued. The bus mapping attributes (e.g. write combining) and the particular instructions used (e.g. write memory barrier) influence the bus transactions generated.

The doorbell function may enforce the action of doorbells. This may involve flagging anomalous doorbells and/or rejecting defective doorbells. The doorbell function may for example coalesce two or more doorbells associated with a given adaptor The programmable interface comprises an address translation service ATS 320 which will be discussed in more detail later. The ATS may be shared by the different instances of the device interface. The programmable interface is configured to cause an IOMMU to be used and/or the ATS. This may be dependent on the device interface specification and/or the particular type of DMA access. The programmable interface may be configured to support one or both of the IOMMU and ATS.

In some embodiments, a common DMA descriptor cache 314 may be provided by the programmable interface. This descriptor cache may for example include all cached descriptors for all the device interface instances. The descriptor cache may have pointers which resolve to a bus physical address. It should be appreciated that it the cache is starting to run out of descriptors for a respective queue, the cache may fetch one or more descriptors for the respective queue. This may be controlled by the descriptor cache and/or by the respective adaptor.

The descriptor cache may evict one or more descriptors, for example if the descriptor is stale or to make room for other descriptors. The eviction may be based on one or more of random, least recently used, priority associated with an adaptor, number of descriptors associated with each adaptor and/or any other suitable criteria.

The operation of the descriptor cache may take into account one or more of service guarantees and usage patterns in determining which descriptors for which queues are fetched and/or when and/or determining which descriptors are to be deleted from the descriptor cache when the descriptor cache is full or getting full. The descriptor cache may attempt to prefetch descriptors in advance to avoid head of line blocking.

The descriptor cache may be partitioned between the different adaptors. The partitions may be such that there is a fixed allocation for each adaptor. The allocation for each adaptor may be the same or differ. Alternatively, the size of the partition may be varied. This may be dependent of factors such as the activity of one or more adaptors and/or the type of activities supported by the adaptor and/or the type of device interface.

The descriptor cache may alternatively be shared between the different adaptors depending on the needs of the adaptors.

In some embodiments, the descriptor cache may have a fixed allocation associated with each adaptor and a shared allocation which is useable by any one or more of the adaptors as required.

The descriptor cache may provide for each adaptor instance a guaranteed cache reservation.

The descriptor cache may provide for an endpoint instance of an adaptor a guaranteed number of descriptors. The endpoint instance may be a queue.

The descriptor cache may be configured to prefetch one or more descriptors in response to one or more of doorbell processing of a doorbell associated with a respective adaptor and/or an arrival of data associated with a respective adaptor.

Figure 3:
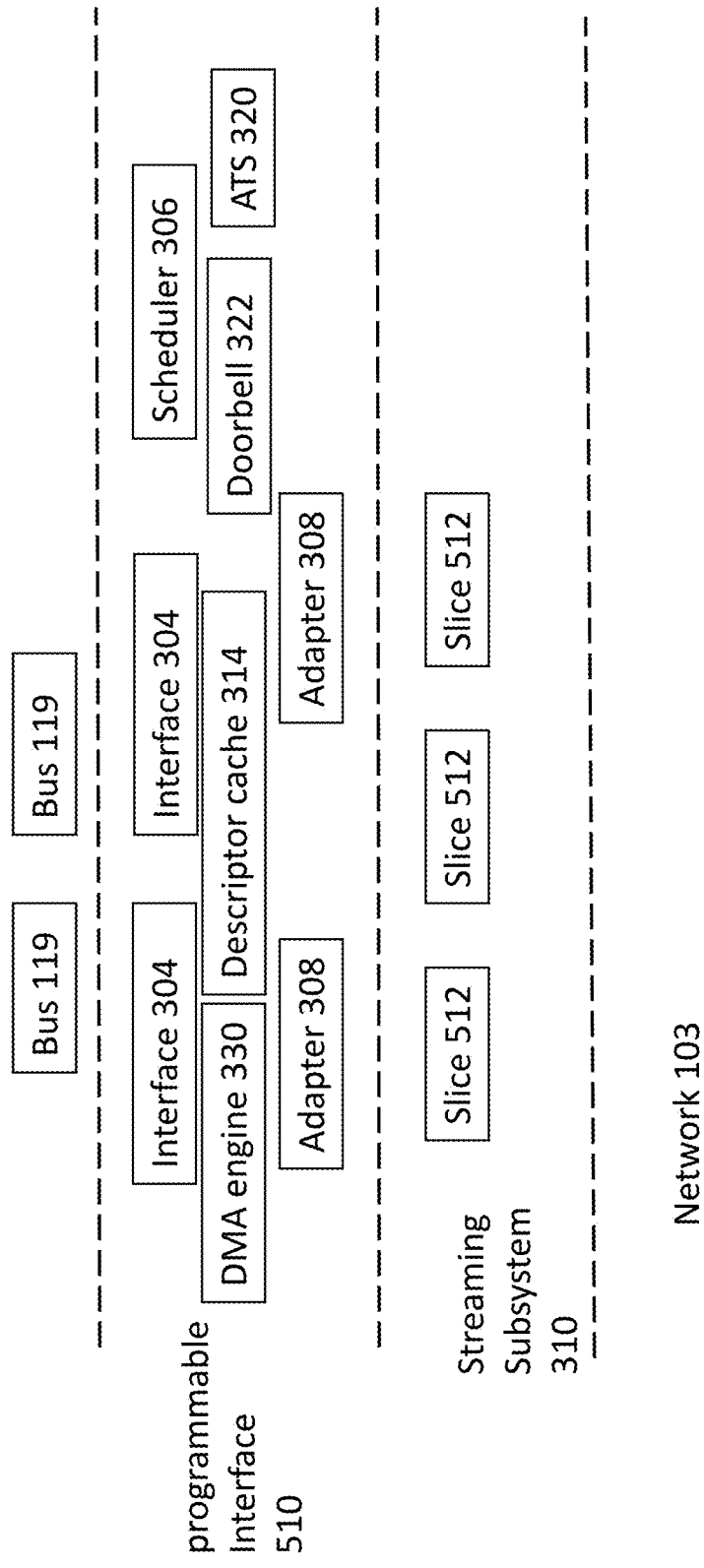
FIG. 3 shows a schematic of a second network interface device.

Reference is made to FIG. 3 which shows in more detail a modification to the programmable interface 510 of FIG. 2.

In this example, the programmable interface is provided with a plurality of interfaces. In this example, two are shown. However, in some embodiments, more than two interfaces may be provided. It should be appreciated that the arrangement of FIG. 2 may be modified to have two interfaces.

In the example shown in FIG. 3, a shared DMA engine 330 is provided. This DMA engine is shared by the different adaptors 308. A shared DMA engine may be used with a single interface, such as shown in FIG. 2.

As will be discussed later, each adaptor in the arrangement of FIG. 2 is provided with a DMA engine, whereas in the example of FIG. 3, the DMA engine is shared by two or more adaptors. A shared DMA engine may be advantageous in that there is an efficient use of resources. A DMA engine which is provided for a specific adaptor can be optimized to the behaviour of that adaptor.

The DMA engine will read DMA commands from the descriptor cache and executes them in a defined sequence. The DMA engine will read the data from memory or write the data to memory. The DMA engine interfaces the bus interface and may handle bus flow control protocol mechanisms such as credits, out of order completions and parallel transactions (for example multiple outstanding transactions). The share of the bandwidth which a DMA engine has is controlled by the scheduler.

Figure 4:
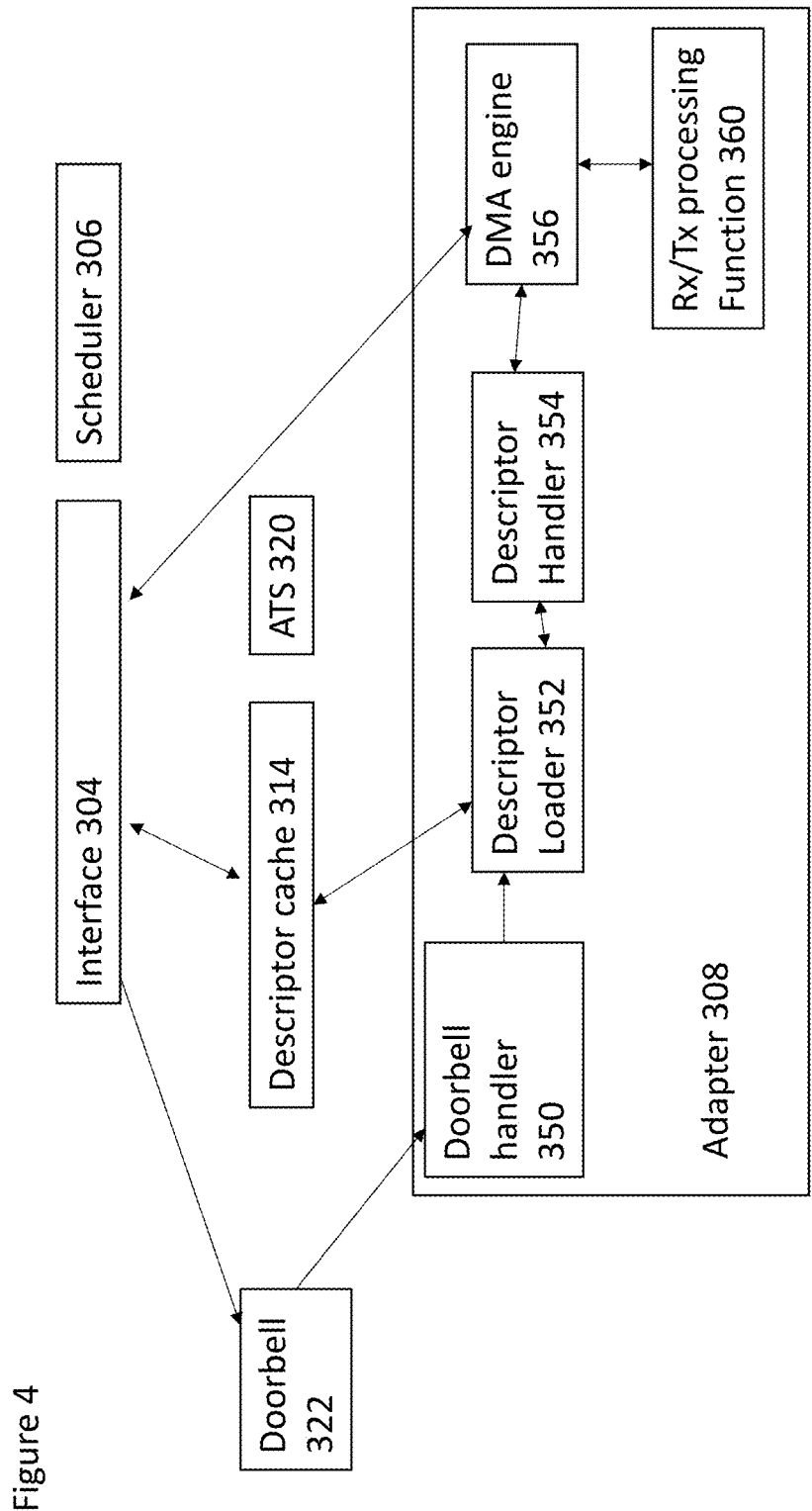
FIG. 4 shows a first example of an adaptor provided in a programmable interface of a network interface device.

Reference is made to FIG. 4 which shows one example of an adaptor 308 of FIG. 2 in more detail.

The adaptor 308 has a doorbell handler 350, a descriptor loader 354, a DMA engine 356 and a RX/TX processing function 360.

When a doorbell is received by the doorbell function 322, it is resolved based upon a dynamic address map to a particular adaptor. The doorbell handler 350 of the particular adapter will parse the doorbell. The doorbell handler may be configured to poll the doorbell function to obtain the doorbells intended for that particular adapter. The parsing will determine one or more of: a command associated with the doorbell, a descriptor, data and a device index. The command may be any suitable command such as read data, write data and/or more complex commands.

The doorbell handler provides an output comprising one or more parts of the parsed doorbell to the descriptor loader. The descriptor loader is configured to assemble the descriptor from the descriptor cache. The descriptor loader is also configured to fetch cache context information such as queue pointers. Cache context information such queue pointers may provide state for the descriptor index.

The descriptor cache will provide the requested descriptor cache line to the descriptor loader. The descriptor cache may DMA descriptor cache lines from one or more of host or device memory. The descriptor cache may prefetch one or more of indirect descriptors and other descriptors. The descriptor cache may evict stale descriptors.

The command and associated descriptor(s) are provided by the descriptor loader to the descriptor handler. The descriptor handler translates to the command(s) to a DMA request chain. Thus, the chain of processing culminates in a list of DMA requests to the DMA engine. The DMA engine will carry out the DMA requests. The DMA requests are scheduled by the scheduler 306.

The DMA engine is programmed with the semantics for a particular device interface. Some DMA responses may be required for the handling of a descriptor. The descriptor handler will be aware of the DMA engine progress via the one or more completions which are provided by the DMA engine to the descriptor handler.

Other DMA responses may be delivered to the RX/TX processing function. The RX/TX processing function is configured to perform functions such as offload processing, reassembly logic and/or the like.

It should be appreciated that FIG. 4 shows one adaptor. It should be appreciated that the programmable interface may support one or a plurality of adaptors.

Figure 5:
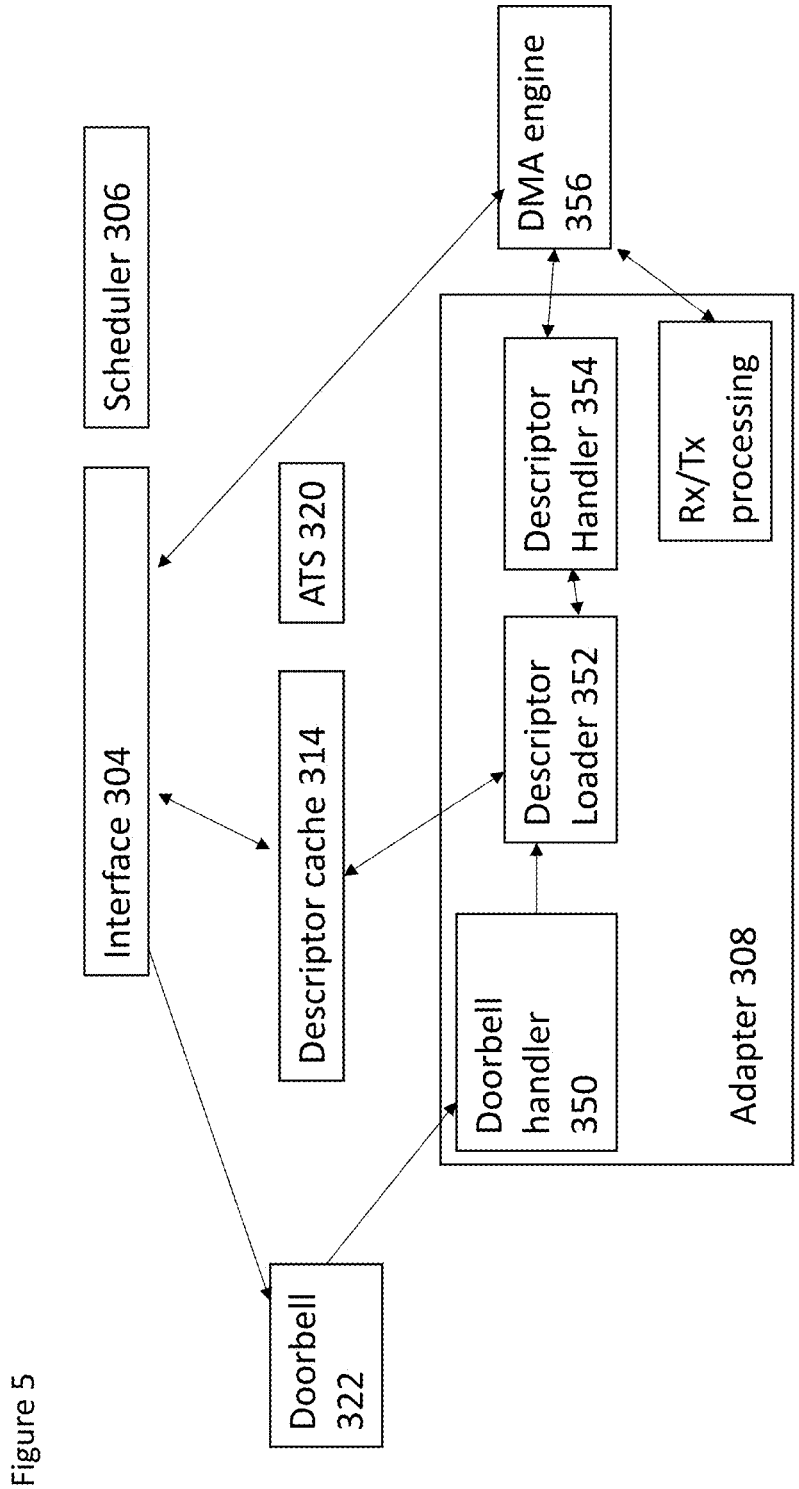
FIG. 5 shows a second example of an adaptor provided in a programmable interface of a network interface device

Reference is made to FIG. 5 which shows one example of an adaptor 308 of FIG. 3 in more detail. The adaptor of FIG. 5 operates in generally the same way as the adaptor of FIG. 4. However, in this case the DMA engine is outside the adaptor and may be shared by two or more different adaptors. However, the interaction with the DMA engine by the descriptor hander and the Rx/TX function is the same as described in relation to FIG. 4. In this embodiment, the scheduler is configured to schedule the DMA accesses by the different adaptors 308 via the common DMA engine.

Figure 7:
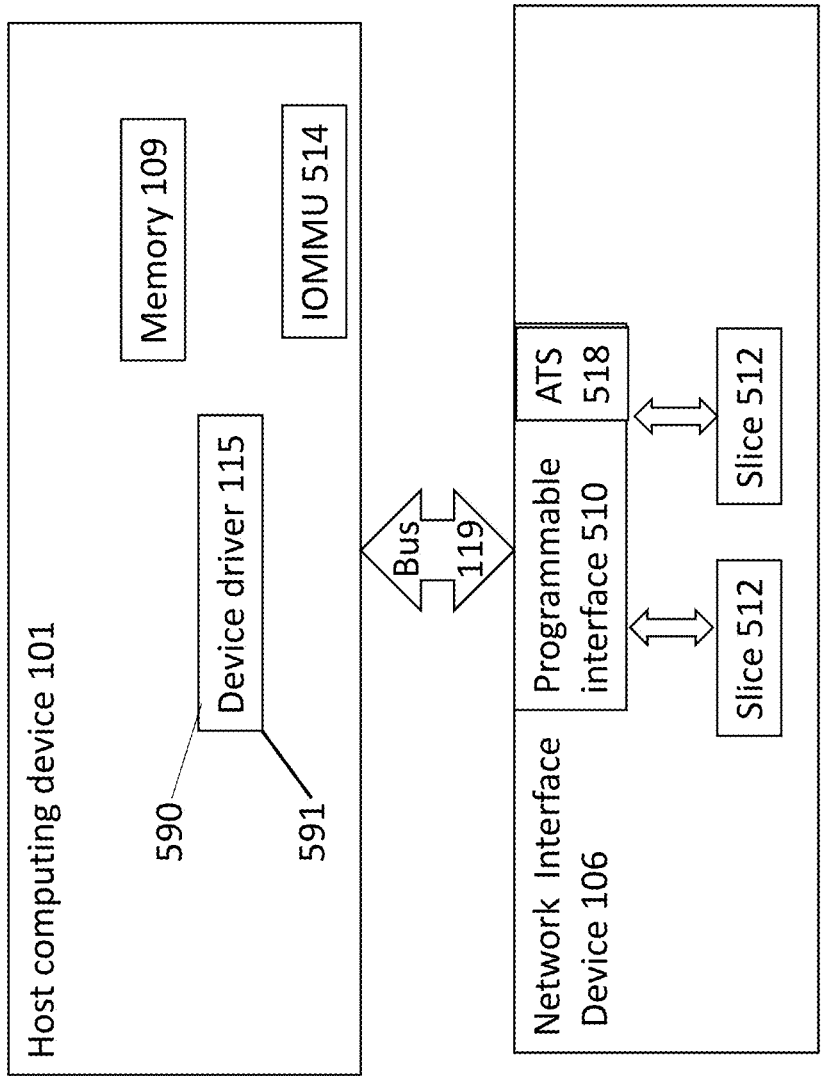
FIG. 7 shows a schematic overview a data processing system from a memory mapping perspective.

Reference is made to FIG. 7 which shows aspects of memory address management of some embodiments. The host computing device 101 is provided with a device driver 115 for the network interface device 106. The device driver 115 effectively makes a part of the memory 109 in the host accessible to the network interface device for DMA reads and writes.

The device driver 115 has a "top edge" referenced 590 which conforms to an operating system device interface API. The operating system device interface API may be a NDIS or a Linux network driver API. The device driver 115 has a "lower edge" referenced 591 which adapts to the network interface device hardware and performs register level operations to enact operations such as API operations, send operations, receive operations, interrupt operations and refill buffer ring operations.

The lower edge may support vendor or device specific operations. In some embodiments, a virtual device interface is standardised making the device driver into a generic device type (for example a network device driver). Virtio and NVME are such examples.

The host may comprise an IOMMU (input/output memory management unit) 514. The IOMMU may be configured to provide memory mapping on the host side. In some embodiments, the memory mapping is made on the host side of the bus 119. Whether such an IOMMU is provided and/or how that IOMMU operates may be part of host CPU and/or chipset architecture.

An address translation may be performed by the IOMMU. The network interface device may "write" data to an address in a descriptor queue. That write transaction is received by the IOMMU and then written to the physical location associated with the address in the descriptor queue. The IOMMU technique may be used for some DMA accesses by the network interface.

The programmable interface may support an address translation service ATS or buffer table. The ATS will translate the address which the device may use for DMA transactions and may form part of a descriptor queue. The address may be translated to a bus or physical address. In the case that the address is translated to a bus physical address, the IOMMU may translate the bus physical address. The ATS may act as a cache for the IOMMU or map a buffer virtual address to a bus physical address or map a buffer virtual address to a physical address where there is no IOMMU. This may be defined at least partially by the required device interface behavior.

In one or more device interface types, no ATS may be provided.

It should be appreciated that how the address translation is managed may defined by the device interface. Thus, the mapping of the address in the descriptor to the physical location may be performed in the IOMMU and/or the ATS depending on the device interface.

In some embodiments, an address space for each application may be provided. The descriptor queue associated with a specific application may have a specific address. In some embodiments, the ATS may be configured to translate that address. It should be noted that a given queue generally is unable to reference memory space associated with another queue. The OS of the host may update a buffer table. An application thread may post a receive descriptor which will define a memory where the application wants its data injected for example or where data to be transmitted is to be fetched from. The network interface device will use a mapping using the ATS or buffer table for example to determine the physical memory location associated with the indicated memory location.

DMA may allow data to be transferred to/from regions of address space which are assigned to the network interface device. This allows data received via a receive slice 512 of the network interface device to be written to the host memory via a DMA process. This allows data in the host memory to be transmitted via a transmit slice 512 of the network interface device, again via a DMA process.

The mapping may be implemented as a private address mapping relative to the context of a descriptor queue, or as a shared data structure for example a system page table or as an address translation cache.

When the network interface device has injected data to the physical location, the event queue of the associated socket may be updated as well as the write pointer in the receive queue used by the network interface device. The network interface device may write or inject the next received data to the next location indicated by the update write pointer in the receive queue. The pointers are stored in the descriptor cache.

One example of a buffer table is shown in FIG. 8 is used to determine the physical location of the buffer (or a bus physical address as discussed previously). The IOMMU or the ATS may be implemented as a buffer table. In some embodiments, the buffer table maps which of the threads or applications is allocated to each buffer and holds the following information for each buffer:

1. Buffer index. This is an identifying number for the buffer, which, is unique for the host. The buffer is identified by this number in the buffer table index field.

2. Ownership. This indicates which application or thread owns the buffer.

3. Physical memory address. The buffer occupies a contiguous block of physical memory, and this number indicates where that block starts (or bus physical address such as discussed previously).

4. Length. This indicates the length of the buffer in memory.

The size of each buffer table entry may be chosen to match the page size of the host system: typically, 4 KBytes. In that way a contiguous region of the application's virtual address space which is mapped onto a non-contiguous region of physical memory can be represented by a sequence of buffer table entries. In other embodiments, a number of sizes may be supported up to GByte Huge Page sizes.

The mapping of the indicated memory to the physical memory location may be performed using the buffer table.

The descriptor cache may comprise a direct or indirect indication as to which adaptor a descriptor is associated with. This is so the correct semantics can be applied to the respective descriptor.

In some embodiments, a given entry in the descriptor cache may comprise one or more:
  a pointer to the location to which data is to be written to/read from;
  an associated adapter instance and/or opaque endpoint index; and
  metadata.

The pointer may be a single pointer, a block of pointers, a linked list of pointers, a tree or any other suitable data-structure.

The metadata may comprise one or more flags.

The metadata may indicate if the pointer is a pointer to a table of descriptors rather than to a buffer and/or if the pointer is to a buffer.

The metadata may indicate a device interface type and/or a size. In some embodiments, the descriptors may vary in size. In some embodiments, there may be a set of different sizes. The meta data may indicate which size is being used.

In some embodiment, the metadata may indicate a device interface type.

The metadata may indicate one or more queue index (location of descriptor relative to a logical queue) and/or the associated queue.

It should be appreciated that the metadata, if provided, will depend on the requirements of the associated device interface. The format of the metadata may depend on the requirements of the associated device interface. The metadata may be treated as opaque by the descriptor cache The device index may provide information as to the application with which the descriptor is associated. This may indicate the adaptor or that may be provided separately in the given entry. The device index may provide information as to whether the entry is for a receive queue, a command queue or a transmit queue or even a window.

In order to keep track of the state of queues and/or windows for the many user-level applications that might be in communication with the network interface device at the same time (and potentially using different device interface specifications), the common descriptor cache may include at least a next descriptor. The descriptor cache may be configured to hold at least a number of descriptors for each endpoint. This allows for example an adapter to ensure that frame delivery is never stalled by a descriptor fetch because at least some number of descriptors will always be available. By way of example the number of descriptors may be 0, 1, 16, 32, 64, 128 descriptors. Different endpoints may be associated with the same or different numbers of descriptors.

Each device interface may have at least one corresponding device index, which may be used as an index into the common descriptor cache.

The host may be configured to download one or more device drivers to support one or more of the device interface types supported by the programmable interface of the network interface device.

In some embodiments, the network interface device may provide the device driver for one or more of the different interface types supported by the network interface device.

The device driver received by the host may be expressed as a device driver or as a program such as eBPF program.

In some embodiments, the device driver and the device interface are generated from a single high-level program. The program is compiled and down loaded by an operating system to a network interface device instance. The host computing device may compile the program to provide firmware or RTL level code for the device interface and a kernel module, device driver, or any other representation suitable for the host interface of the native operating system The host computing device may be configured to compile the high-level language program to an intermediate level language program for the host interface (device driver). This intermediate level language program may be verified if the program is to be inserted into a higher privileged domain such as a kernel. By way of example only, the intermediate level language program may be an eBPF (or an extended eBPF) program.

The host computing device may be configured to compile the high-level language program to an intermediate level language program for the device interface. (For example, HLS, or firmware for execution physical device)

The source of the high-level program may be an application with a higher level of privileged or a lower level of privilege. An application with a higher level privilege may be a so-called trusted application and so entrusted to make kernel level or the like modifications. An application with a lower level privilege may be a so-called untrusted application and so is unable to make kernel level or the like modifications. However, the compiled output of an untrusted application may be either verified to be safe to use by a privileged verifier or else be executed in a sand-box environment.

The application may express the semantics for the device interface using a high-level language which is compiled to the device driver in the host and the device interface in the network interface device. Depending on the privilege associated with the application, the device driver may be inserted into the kernel (with a higher privilege) or outside the kernel (with a lower privilege).

The program for the network interface device which is used by the programming interface to provide the required device interface may be associated with a higher or a lower privilege. If the program has a higher privilege, then the program may use any or all of the hardware functions associated with the higher privilege. If the program has a lower privilege, then the program may use only hardware associated with a lower privilege. By way of example, if the program is associated with a lower level of privilege then access may be limited to certain DMA buffers and/or the number of interrupts allowed may be limited and/or interrupts may not be allowed and/or the scheduling of access to the bus may be limited.

In some embodiments, the device interface may be provided in a sandbox environment on the network interface device. For example, the adaptor may be provided in a sandbox environment. The sandbox environment may be used with adaptor associated with a lower level of privilege.

In some embodiments, the programming of the ATS may be controlled in dependence on the privilege associated with a given adaptors. This is to ensure that a lower privileged adaptor is not given access to buffers associated with a higher level of privilege or only the buffers to which the adapter is allowed to access.

In some embodiments, the programmable interface may be provided with the template functions such as one or more of the following as templates: scheduler function, doorbell function, ATS function, descriptor cache, DMA engine (where shared) and a plurality of adaptors. When program code or the like is received by the programmable interface for a particular device interface, this will cause the template for the adaptor to be modified so as to be in accord with the particular device interface. One or more of the templates of the scheduler function, doorbell function, ATS function, descriptor cache and DMA engine may be modified to support the particular device interface.

In some embodiments, the programing of the programmable interface may be performed at run time. In some embodiments, the programming of the programmable interface may be performed during the operation of the host computing device and the network interface device.

The previously described embodiments have discussed a programmable interface for use between a network interface device and a host device. It should be appreciated that alternatively or additionally, the programmable interface may be used for routing on the network interface device. For example, there may be components on the network interface device which are configured to communicate using a bus. That bus may be any of the previously discussed types of bus.

For example, the network interface device may comprise two or more ASICs which are configured to communicate using a bus such as a PCIe bus. In some embodiments, the same programmable interface which is configured to interface with the host device may also be configured to interface between two or more components on the network interface device. In other embodiments, a separate programmable interface may be used to interface with the host device as compared to that which is required to interface between components on the network interface device.

Figure 6:
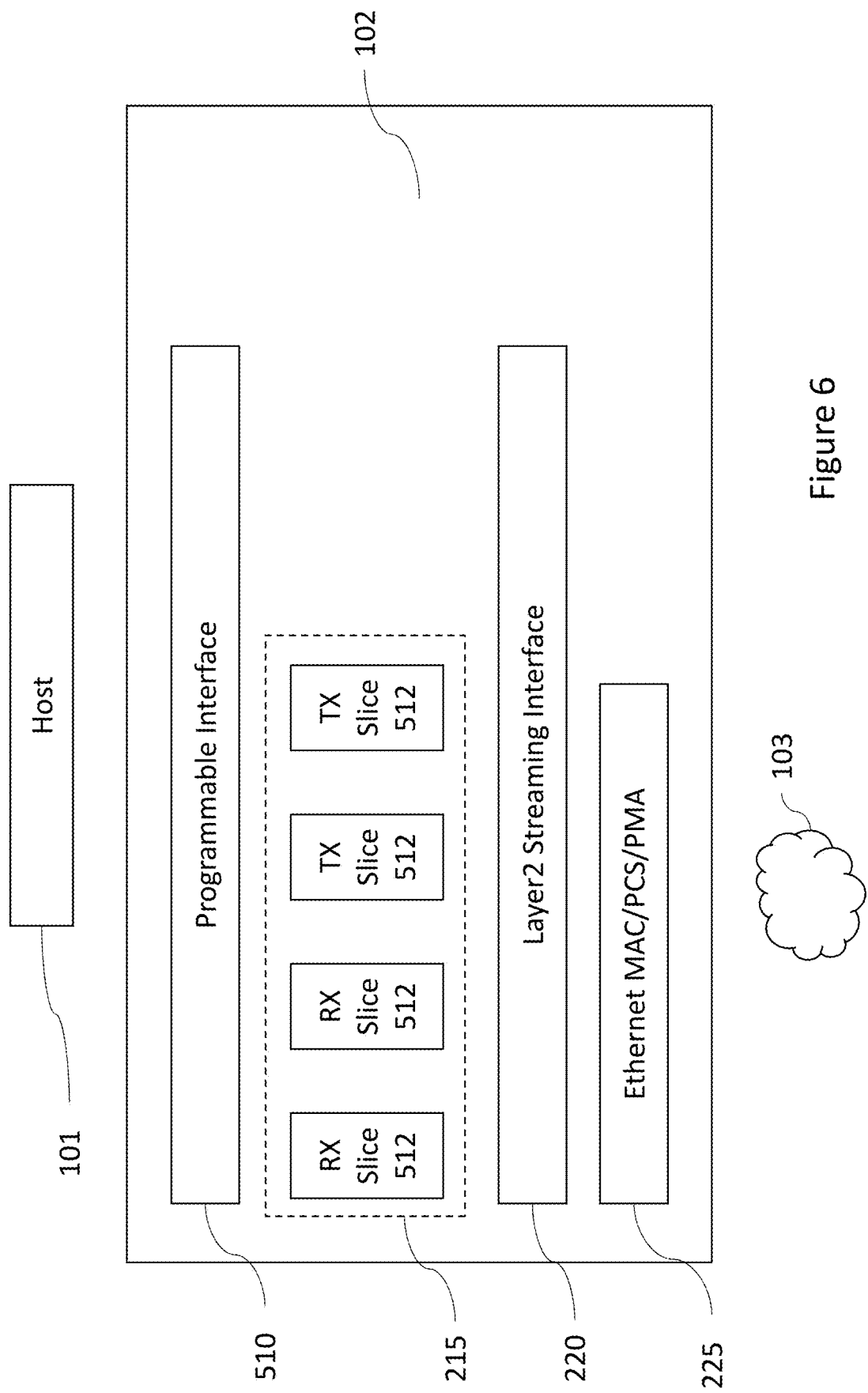
FIG. 6 shows a schematic view of another network interface device.

By way of example only, some example an example network interface device including a programmable interface such as previously described will now be described with reference to FIG. 6.

In some embodiments, the protocol processing may be offloaded to the network interface device to be performed in the network interface. In the case that such offloading is performed at the network interface device, it may desirable to implement functionality on the network interface device that can make use of the protocol processing capabilities of the network interface device. By implementing such functionality in the network interface device instead of the host, potential improvements in latency may be achieved by reducing the data transfer between the host and the network interface device.

The network interface device 102 comprises a transport engine 215, configured to process the data packets in accordance with a transport protocol, such as TCP/IP. The transport engine 215 may comprise a protocol stack. The transport engine 215 may comprise a plurality of slices 512 or data pipelines, some of the slices being RX slices configured to perform receive processing of the ingress data packets received from the network 103, and some of the slices being TX slices configured to perform transmit processing of the egress data packets to be transmitted onto the network 103. In some embodiments, a slice may be able to handle both data to be transmitted and received data.

In the example shown, four slices are provided. However, it should be appreciated that in other embodiments, a different number of slices are used. In one embodiment, a slice may be arranged to process received data or to process data to be transmitted. In other embodiments, a slice may be arranged such that it is able to process received data and data to be transmitted. In some embodiments, the number of slices may be the same as the number of ports. In some embodiments, there may be a transmit slice and a receive slice for each port. In some embodiments, there may not be a direct correlation between the number of ports and the number of slices. In some embodiments, a slice can be switched dynamically from processing received data to processing transmitted data and vice versa.

Each slice may be regarded as a processing engine. Each slice may thus execute micro code to implement functions such as parsing, matching offload and delivery semantics for the data path. The slice may act on any bit of a frame.

The slices may perform a parsing action on the data which the slice is processing. There may be a matching action which matches the data against for example a filter and action function which performs an action or not in dependence on the result of the matching.

The network interface device may provide functionality such as flow steering and low latency operation, hardware timestamping and clock synchronisation.

An Ethernet interface 225 is configured to receive the data packets from the network and pass them to a layer 2 streaming interface 220. The layer 2 streaming interface 220 is configured to pass the data packets to the transport engine 215, which performs processing of the data packets, prior to passing the processed data packets to the programmable interface 510. The programmable interface 510 is configured to pass at least some of the data to the host 101 in DMA write operations, for example. A reverse of this path may be followed for data which is to be transmitted onto the network. The protocol processed data packets may be passed to the layer 2 interface 220 and subsequently the Ethernet interface 225 prior to their transmission onto the network 2103.

Reference is made to FIG. 9 which shows a method of some embodiments. In step S1, a programmable interface of a network interface device is programed to provide a device interface with at least one bus between the network interface device and a host device, the programmable interface being programed to support a plurality of different types of a device interface.

Figure 10:
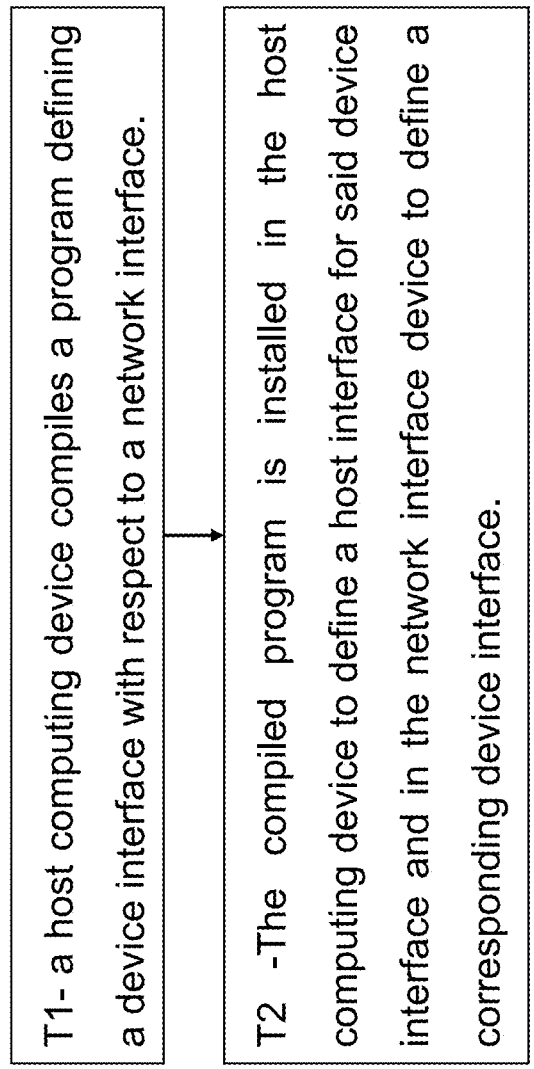
FIG. 10 shows a method of another embodiment.

Reference is made to FIG. 10 which shows a method of some embodiments. In step T1, a host computing device compiles a program defining a device interface with respect to a network interface.

In step T2, the compiled program is installed in the host computing device to define a host interface for said device interface and in the network interface device to define a corresponding device interface.

As used herein, "identification" of an item of information does not necessarily require the direct specification of that item of information. For example, a pointer "identifying" a starting address in memory may specify the entire physical memory address, or it may specify an address in a larger memory address space which is mapped to a physical address, or it might specify a virtual address which is mapped to a physical address, or it might specify an address in a user address space which is mapped to a physical address in further dependence upon a user ID of some kind, or it may identify in any of these ways an address that is one less or one greater than the actual starting address identified, and so on.

A host computing or processing device or system may be any suitable computing device or system. By way of example, the host computing device may comprise one or more of a server, a personal computer, a switch, a router, a bridge, a virtualised system (e.g. a virtualised operating system and the applications it supports), a portable device such as a tablet computer or smartphone or any other suitable computing device. In some embodiments the host computing device may be provided by a set of two or more computing devices. These computing devices may be the same or different. These computing devices may be any one or more of the previous examples of computing devices.

The network interface device may be any hardware device configured to interface a wired or wireless network to a host computing device. The network interface device could be provided in any manner between a network and host device. The network interface device may be an integral part of the host processing device. The physical hardware components of the network interfaces are sometimes referred to network interface cards (NICs) although they need not be in the form of cards. For example, they could be in the form of integrated circuits (ICs) and connectors fitted directly onto a motherboard. The network interface device may be provided by a LAN (local area network) or LOM (LAN on motherboard). The network interface device may alternatively or additionally be provided as one or more peripheral devices such as a PCIe card of the host computing device. It should be appreciated that in other embodiments, any other suitable network interface device may be used.

The network interface device may be implemented by at least one processor and at least one memory.

The embodiments may be implemented by computer software executable by a data processor, such as in a processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), as non-limiting examples.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A network interface device comprising:
a programmable interface that comprises a programmable device, the programmable interface configured to: provide a first set of one or more instances of device interfaces and, during operation of the network interface device, to change the first set of one or more instances of device interfaces provided by the programmable interface to a second set of one of more instances of device interfaces, wherein the change from the first set to the second set of one or more instances of device interfaces comprises the programmable interface being configured to, at least one of: i) remove at least one instance of device interface from the network interface device, during operation of the network interface device, and ii) add at least one instance of device interface from the network interface device, during operation of the network interface device,
wherein each instance of device interface is with at least one bus, wherein the at least one bus is provided between the network interface device and a host device,
the programmable interface being programmable to:
support a plurality of different types of a device interface during operation of the network interface device; and
wherein the programmable interface comprises a scheduler configured to schedule access to the at least one bus for each instance of device interface.

2. The network interface device as claimed in claim 1, wherein said programmable interface is configured to support at least two instances of device interfaces at the same time.

3. The network interface device as claimed in claim 1, wherein the second set of one or more instances of device interfaces comprises: the one or more instances of device interfaces of the first set of one or more other instances of device interfaces, and at least one further instance of a device interface.

4. The network interface device as claimed in claim 1, wherein the second set of one or more instances of device interfaces comprises: some of the one or more instances of device interfaces of the first set of one or more instances of device interfaces.

5. The network interface device as claimed in claim 1, wherein none of the instances of device interfaces of the first set of one or more instances of device interfaces are provided in the second set of one or more instances of device interfaces, such that the one or more instances of device interfaces of the first set are different to the one or more instances of the second set.

6. The network interface device as claimed in claim 2, wherein the programmable interface comprises a common descriptor cache, said common descriptor cache configured to store respective entries for transactions for the at least two instances of device interface instances.

7. The network interface device as claimed in claim 6, wherein an entry in said common descriptor cache comprises one or more of:
pointer information;
adapter instance and/or opaque endpoint index; and
metadata.

8. The network interface device as claimed in claim 6, wherein the common descriptor cache:

is at least partly partitioned with different partitions being associated with different device interface instances, and/or is shared between different device interface instances, and/or provides for each device interface instance a guaranteed cache reservation.

9. The network interface device as claimed in claim 6, wherein said common descriptor cache provides for an endpoint instance of a device interface a guaranteed number of descriptors.

10. The network interface device as claimed in claim 6, wherein said common descriptor cache is configured to prefetch one or more descriptors for one or more device interfaces.

11. The network interface device as claimed in claim 6, wherein said common descriptor cache is configured to prefetch one or more descriptors for one or more device interfaces in response to one or more of doorbell processing of a doorbell associated with a respective device interface or an arrival of data associated with a respective device interface.

12. The network interface device as claimed in claim 2, wherein said programmable interface is configured to provide for each device interface instance, a respective device interface adaptor, wherein the respective device interface adaptor comprises a DMA engine.

13. The network interface device as claimed in claim 2, wherein said programmable interface is configured to provide a DMA engine which is shared by said at least two instances of device interfaces.

14. The network interface device as claimed in claim 2, wherein said programmable interface is configured to provide at least one of:

a doorbell function which is shared by said at least two instances of device interfaces; and an address translation service which is shared by said at least two instances of device interfaces.

15. The network interface device as claimed in claim 1, wherein at least two of said plurality of different types of device interface are:

associated with different queue structure types, and/or
associated with one or more of different semantics or commands.

16. The network interface device of claim 1, wherein said programmable interface comprises one or more template functions which are programmable to support one or more of said different types of device interface.

17. The network interface device as claimed in claim 1, wherein said network interface device is configured to receive, from one of: said host device or a network, program information configured to control the programming of said programmable interface.

18. A data processing system comprising a host device and a network interface device, said network interface device comprising:

a programmable interface that comprises a programmable device, the programmable interface configured to: provide a first set of one or more instances of device interfaces and, during operation of the network interface device, to change the first set of one or more instances of device interfaces provided by the programmable interface to a second set of one of more instances of device interfaces, wherein the change from the first set to the second set of one or more instances of device interfaces comprises the programmable interface being configured to, at least one of: i) remove at least one instance of device interface from the network interface device during operation of the network interface device, and ii) add at least one instance of device interface from the network interface device during operation of the network interface device, wherein each instance of device interface is with at least one bus, wherein the at least one bus is provided between the network interface device and a host device, the programmable interface being programmable to support a plurality of different types of a device interface during operation of the network interface device; and wherein the programmable interface comprises a scheduler configured to schedule access to the at least one bus for each instance of device interface.

19. A method comprising:

Programming a programmable interface that comprises a programmable device to: provide a first set of one or more instances of device interfaces and, during operation of a network interface device, to change the first set of one or more instances of device interfaces provided by the programmable interface to a second set of one of more instances of device interfaces, the changing from the first set to the second set of one or more instances of device interfaces comprising at least one of: i) removing at least one instance of device interface from the network interface device during operation of the network interface device, and ii) adding at least one instance of device interface from the network interface device during operation of the network interface device, wherein each instance of device interface being with at least one bus, and wherein the at least one bus is provided between the network interface device and a host device, the programmable interface being programmable to support a plurality of different types of a device interface during operation of the network interface device; and scheduling access to the at least one bus for each instance of device interface.

20. A non-transitory computer readable medium encoded with instructions, in which the instructions when executed on at least one processor enable the at least one processor to execute the steps of:

programming a programmable interface that comprises a programmable device to: provide a first set of one or more instances of device interfaces and, during operation of a network interface device, to change the first set of one or more instances of device interfaces provided by the programmable interface to a second set of one of more instances of device interfaces, the changing from the first set to the second set of one or more instances of device interfaces comprising at least one of: i) removing at least one instance of device interface from the network interface device during operation of the network interface device, and ii) adding at least one instance of device interface from the network interface device during operation of the network interface device, wherein each instance of device interface being with at least one bus, and wherein the at least one bus is provided between the network interface device and a host device, the programmable interface being programmable to support a plurality of different types of a device interface during operation of the network interface device; and scheduling access to the at least one bus for each instance of device interface.

21. The network interface device as claimed in claim 1, wherein the programmable device comprises one or more of: a field programmable gate array, and an application specific integrated circuit.

* * * * *